United States Patent [19]
Suzuki

[11] Patent Number: 6,059,678
[45] Date of Patent: May 9, 2000

[54] RACHET TENSIONER

[75] Inventor: Tadasu Suzuki, Higashimurayama, Japan

[73] Assignee: Tsubakimoto Chain Co., Osaka, Japan

[21] Appl. No.: 09/126,179

[22] Filed: Jul. 30, 1998

[30] Foreign Application Priority Data

Jun. 2, 1998 [JP] Japan ................................ 152774/1998

[51] Int. Cl.$^7$ ...................................................... F16H 7/08
[52] U.S. Cl. ........................................... 474/110; 474/101
[58] Field of Search ................................... 474/101, 109, 474/110, 111, 113–117, 135, 136, 138

[56] References Cited

U.S. PATENT DOCUMENTS

| | | |
|---|---|---|
| 4,822,320 | 4/1989 | Suzuki . |
| 4,874,352 | 10/1989 | Suzuki . |
| 4,881,927 | 11/1989 | Suzuki ..................................... 474/110 |
| 5,006,095 | 4/1991 | Suzuki . |
| 5,030,169 | 7/1991 | Kiso et al. .............................. 474/110 |
| 5,913,742 | 6/1999 | Nakamura et al. ..................... 474/101 |

FOREIGN PATENT DOCUMENTS 38415  2/1991  Japan .
2516271  8/1996  Japan .

*Primary Examiner*—David A. Bucci
*Assistant Examiner*—Marcus Charles
*Attorney, Agent, or Firm*—Dann, Dorfman, Herrell & Skillman; Henry H. Skillman

[57] ABSTRACT

A ratchet tensioner comprising a ratchet (1) having a first ratchet prong (6) engageable with one of ratchet teeth (T) at a position displaced from the axis (O) of a ratchet shaft (3) toward the free end of a plunger (5), and a second ratchet prong (7) receivable between two adjacent ones of the ratchet teeth (T) at a position located on a line (N) extending through the axis (O) of the ratchet shaft (3) perpendicular to an axis of the plunger (5) when the first ratchet prong (6) is in mesh with the one ratchet tooth (T). A projecting length (S2) of the second prong (7), which is measured from the axis (O) of the ratchet shaft (3) to the top of the second ratchet prong (7) in a direction parallel to the perpendicular line (N), is made smaller than a corresponding projecting length (S1) of the first ratchet prong (6) at least by an amount equal to the given manufacturing tolerance in the production of the ratchet.

3 Claims, 3 Drawing Sheets

RACHET TENSIONER

FIELD OF THE INVENTION

The present invention relates to a ratchet tensioner used for applying a proper tension onto a timing belt or a timing chain of an engine for vehicles.

BACKGROUND OF THE INVENTION

FIGS. 2 and 3 illustrate a chain transmission device for transmitting rotation between a crankshaft and a camshaft of an engine with a ratchet tensioner which has been used widely to apply a proper tension onto a free run of a timing belt or a timing chain for dampening vibrations while the belt or chain is running.

The ratchet tensioner A1 is mounted on a body of the engine at the slack side of the chain (timing chain) A6 extending between a drive sprocket A3 rotatably driven by a crankshaft A2 of the engine and a driven sprocket A5 firmly secured to a camshaft A4. The ratchet tensioner A1 includes a plunger A8 partly projecting from the from the front surface of a tensioner housing A7, and a tensioner lever A10 pivotally supported on the engine body via a support shaft A9. A free end F of the plunger A8 engages the back side of the tensioner lever A10 and biases the free end portion so that a shoe surface A11 on the front side of the tensioner lever A10 is urged onto sliding contact with a free run of the chain A6 to thereby apply a tension onto the chain A6. The tensioner housing A7 has a plunger receiving hole A12 in which the plunger A8 is slidably received for axial displacement relative to the tensioner housing A7. Adjacent the free end F, the plunger has a free end portion projecting from the hole A12.

The plunger A8 has an internal space or hollow portion A13 open at one end face of the plunger A8 which is disposed near the bottom the plunger receiving hole A12. A plunger spring A14 fits in the hollow portion A13 of the plunger A8 and acts between the bottom of the plunger receiving hole A12 and the bottom of the hollow portion A13 and normally urges the end portion of the plunger A8 to project from the plunger receiving hole A12 of the tensioner housing A7.

A ratchet A16 is pivotally supported on the tensioner housing A7 via a ratchet shaft A15. As shown in FIG. 3, the ratchet A16 has a first ratchet prong A17 and a second ratchet prong A18 both engageable with ratchet teeth T formed on one side of the plunger A8. By a ratchet spring A19 disposed between the ratchet A16 and the tensioner housing A7, the ratchet A16 is normally urged to turn about the ratchet shaft A15 in such a direction that the first and second ratchet prongs A17, A18 are held in mesh with the ratchet teeth T on the plunger A8. The prongs are spaced apart by an integral multiple of the tooth spacing in the illustrated device, the prong spacing is twice the tooth spacing. Mainly by meshing engagement between the first ratchet prong A17 and the ratchet teeth T, the plunger A8 is prevented from displacing in the backward direction. The second ratchet prong A18 is provided to increase the amount of backlash when the first ratchet prong A17, which is in mesh with one ratchet tooth T, comes in meshing engagement with the next ratchet tooth T as the plunger A8 is displaced forwardly. Tensioners having such ratchet with double ratchet prongs are described in Japanese Utility Model Registration No. 2516271 Japanese Patent Publication No. HET 3-8415.

In the ratchet tensioner A1 shown in FIG. 1, the plunger receiving hole A12 of the tensioner housing A7 and the hollow portion A13 of the plunger A8 jointly form a high pressure chamber H into which an oil is supplied from the outside of the tensioner housing A7 through an oil passage A20 and a ball check valve A21 so as to dampen or absorb pulsation of the tension tending to apply an impact or shock force onto the chain A6 while the chain A6 is running. When an impact or shock force is exerted from the chain A6 through the tensioner lever A10 against the free end F of the plunger A8, the plunger A8 retracts within a range of the backlash. In this instance, the oil in tho high pressure chamber H is compressed to develop a rapid pressure rise in the high pressure chamber H whereupon a check ball A22 of the ball check valve A21 is forced against a ball seal A23 to thereby close an opening which is in fluid communication with the oil passage A20. Consequently, the oil is trapped in the high pressure chamber H, and as the pressure inside the high pressure chamber H further increases, the oil is forced to leak through a slight clearance between the outer peripheral surface of the plunger A8 and the inner peripheral surface of the plunger receiving hole A12 to the outside of the plunger housing A7. During that time, the oil produces a flow resistance which is effective to dampen or absorb the impact or shock force acting on the plunger A8.

Prolonged use of the tensioner causes an elongation of the chain A6 which may permit the plunger A8 to be displaced in the forward or projecting direction beyond the backlash whereupon the first and second ratchet prongs A17 and A18 are brought into meshing engagement with other teeth T than as engaged before. Thus, the tensioner lever A10 while being biased by the plunger A8 can automatically take up or accommodate the elongation of the chain A6.

In the ratchet tensioner of the foregoing construction, as shown in FIG. 3, the second ratchet prong A18 is designed to mesh with the ratchet tooth T at a position located on an imaginary line N perpendicular to the axial line of travel of the plunger and passing through the axis O of the ratchet shaft A15, when the first ratchet prong A17 is in mesh with the ratchet tooth T. The first and second ratchet prongs A17 and A18 are manufactured such that an extent of projection (projecting length) S1 of the first ratchet prong A17 measured from the axis O of the ratchet shaft A15 to a top of the prong A7 in a direction parallel to the perpendicular line N and an extent of projection (projecting length) S2 of the second ratchet prong A18 measured from the axis O of the ratchet shaft A15 to a top of the prong A18 in a direction parallel to the perpendicular N, considering the manufacturing tolerances of the respective projection extents are substantially the same. Even though both prongs A17 and A18 are manufactured within allowable tolerance, the projecting length S2 of the prong 18 may be greater than the projecting length S1 of the prong A17 in which instance the second ratchet prong A18 tends to interfere with a bottom surface or land between two adjacent ratchet teeth T to thereby lock the plunger A8 in position. Once the plunger A8 is locked in position, it is no longer possible to make the tensioner lever A10 adaptable to wear elongation of the chain A6, thus failing to permit the prescribed function of the tensioner. To avoid the foregoing problem, an attempt was made to increase the accuracy to such an extent to make the projecting length S1 of the first ratchet prong A17 precisely equal to the projecting length S2 of the second ratchet prong A18. However, the attempted process requires higher part accuracies and hence lowers the productivity in the manufacturing of the parts.

Further, even if the projecting length S1 of the first ratchet prong A17 and the projecting length S2 of the second ratchet prong A18 are made equal each other, there still arises a problem that when fine foreign matter or contaminant, such as metal particles produced due to abrasive wear from sliding portions within the engine enters together with a lubricant the slight clearance between the plunger receiving hole A12 of the tensioner housing A7 and a portion of the outer peripheral surface of the plunger A8 opposed from a peripheral surface portion on which the ratchet teeth T are formed. In such a case, the particles may cause lateral displacement or tilting of the plunger A8 and displacement of the plunger teeth toward the ratchet shaft A15. As a result, the second ratchet prong A18 interferes with a bottom land two adjacent ratchet teeth T to thereby lock the plunger A8 in position.

SUMMARY OF THE INVENTION

It is accordingly an object of the present invention to provide a ratchet tensioner which is capable of preventing interference between a ratchet prong and ratchet teeth to thereby insure smooth and reliable movement of a plunger and which can be manufactured with improved productivity.

To achieve the foregoing object, a ratchet tensioner according to the present invention includes a plunger slidably received in a plunger receiving hole in a tensioner housing and urged by a spring such that a free end portion of the plunger projects from the plunger receiving hole, and a ratchet pivotally supported by a ratchet shaft mounted on the tensioner housing, the ratchet having ratchet prongs engageable with ratchet teeth formed on one side of the plunger, so as to prevent the plunger from displacing backwards. The ratchet has a first ratchet prong engageable with one of the ratchet teeth at a position displaced from an axis of the ratchet shaft toward the free end of the plunger, and a second ratchet prong receivable between two adjacent ones of the ratchet teeth at a position located in proximity to an imaginary line perpendicular to the axis of the plunger and passing through the pivotal axis of the ratchet shaft when the first ratchet prong is in mesh with the one ratchet tooth. The first and second ratchet prongs have respective projecting lengths measured from the axis of the ratchet shaft to tops of the first and second ratchet prongs measured in a direction parallel to the imaginary perpendicular line. The projecting length of the second ratchet prong is smaller than the projecting length of the first ratchet prong at least by a given manufacturing tolerance of the projecting lengths, and is long enough to engage in the space between the ratchet teeth.

BRIEF DESCRIPTION OF THE DRAWINGS

All of the objects of the present invention are more fully set forth hereinafter with reference to the accompanying drawings, wherein.

OPERATION

Figure 1:
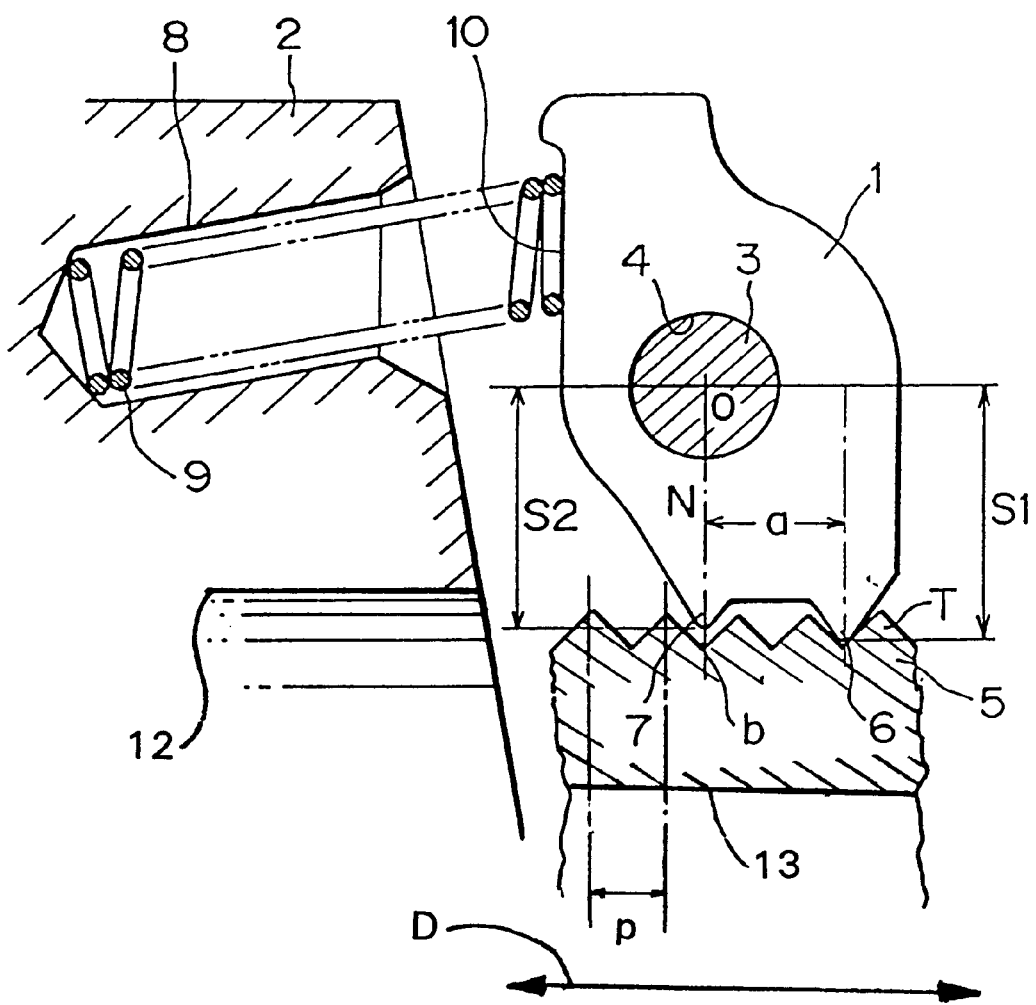
FIG. 1 is a cross-sectional view showing a main portion of a ratchet tensioner according to an embodiment of the present invention.

Referring to the tensioner shown in FIG. 1, the plunger, urged by the spring in a direction to project from the tensioner housing, applies a proper tension to a free run of the chain to thereby prevent slack and oscillation of the chain while the chain is running. The plunger is axially movable back and forth relative to the tensioner housing to accommodate variations of the chain tension within a backlash corresponding to the distance between a first position in which the first ratchet prong is in mesh with one of the ratchet teeth to prevent backward movement of the plunger, and a second position in which the first ratchet prong is in mesh with the next ratchet tooth. When the first ratchet prong is in the first position described above, a slight advancing movement of the plunger will rotate the ratchet counterclockwise to bring the second ratchet prong into contact with a ratchet tooth. As the plunger further advances, the ratchet tooth forces the second ratchet prong in a direction to turn the ratchet counterclockwise about the ratchet shaft to thereby separate the first ratchet prong from the ratchet tooth. As long as the second ratchet prong keeps meshing engagement with the currently engaged ratchet tooth, an increase in the chain tension forces the plunger backwards against the force of the spring whereupon the ratchet pivotally moves clockwise back to its original position in which the first ratchet prong meshes again with a ratchet tooth on the plunger. Since the meshing engagement relative to the ratchet teeth on the plunger shifts from the first prong to the second prong, it becomes possible to increase the amount of backlash and thus prevent the chain from being subjected to undue tension while the chain is running.

It may occur that due to wear elongation, the plunger is displaced forwardly beyond the backlash. On that occasion, the second ratchet prong is disengaged from the front of the pivotally-engaged ratchet tooth, allowing the ratchet to turn clockwise in a direction to cause the first ratchet prong to move into meshing engagement with the next ratchet tooth which is in the rear of the previously engaged ratchet tooth. Then, a further backward displacement of the plunger is prevented by the engagement between the first ratchet prong and the rear of the previously engaged ratchet tooth. When the top of the second ratchet prong is disposed in a position closest to a bottom land between two adjacent ones of the ratchet teeth in response to pivotal movement of the ratchet about the ratchet shaft, there is a slight clearance between the top of the second ratchet prong and the bottom land of the ratchet teeth. Thus, the second ratchet prong does not interfere with the bottom land of the ratchet teeth.

DETAILED DESCRIPTION OF THE PREFERRED EMBODIMENT

A preferred embodiment of the present invention will be described in detail with reference to FIG. 1. The ratchet tensioner includes a ratchet 1 having a shaft hole 4 fitted around a ratchet shaft 3 secured to a tensioner housing, in a like manner as the conventional tensioner shown in FIG. 2. The ratchet 1 is pivotally supported by and pivotal about the ratchet shaft 3. The ratchet 1 is provided with a first ratchet prong 6 and a second ratchet prong 7 which have their tops engageable with a row of ratchet teeth T provided on a portion of an outer peripheral surface of a plunger 5 in an axial direction of the plunger 5, indicated at D in FIG. 1.

Figure 2:
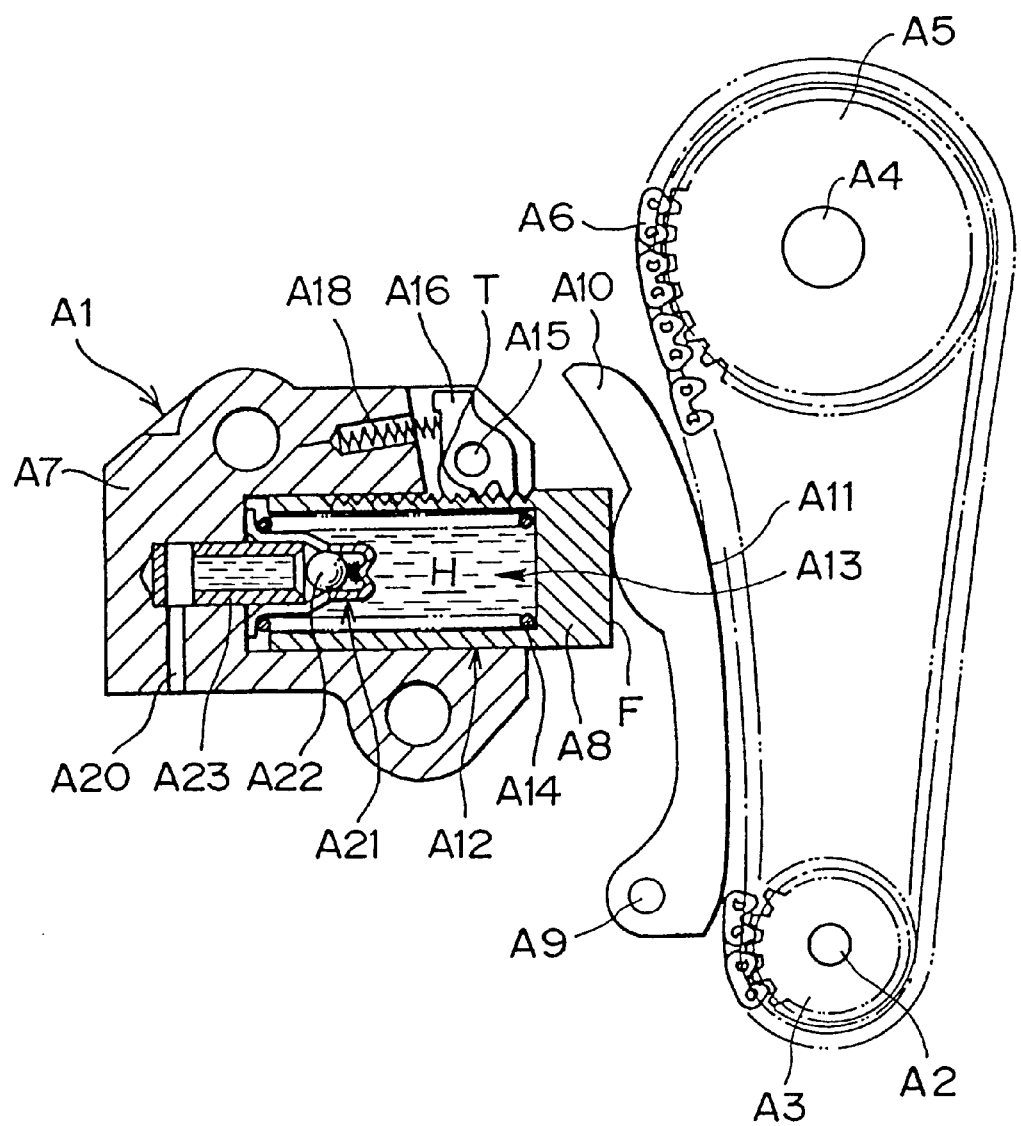
FIG. 2 is a cross-sectional view showing an example of the conventional ratchet tensioner applied to a timing chain.
Figure 3:
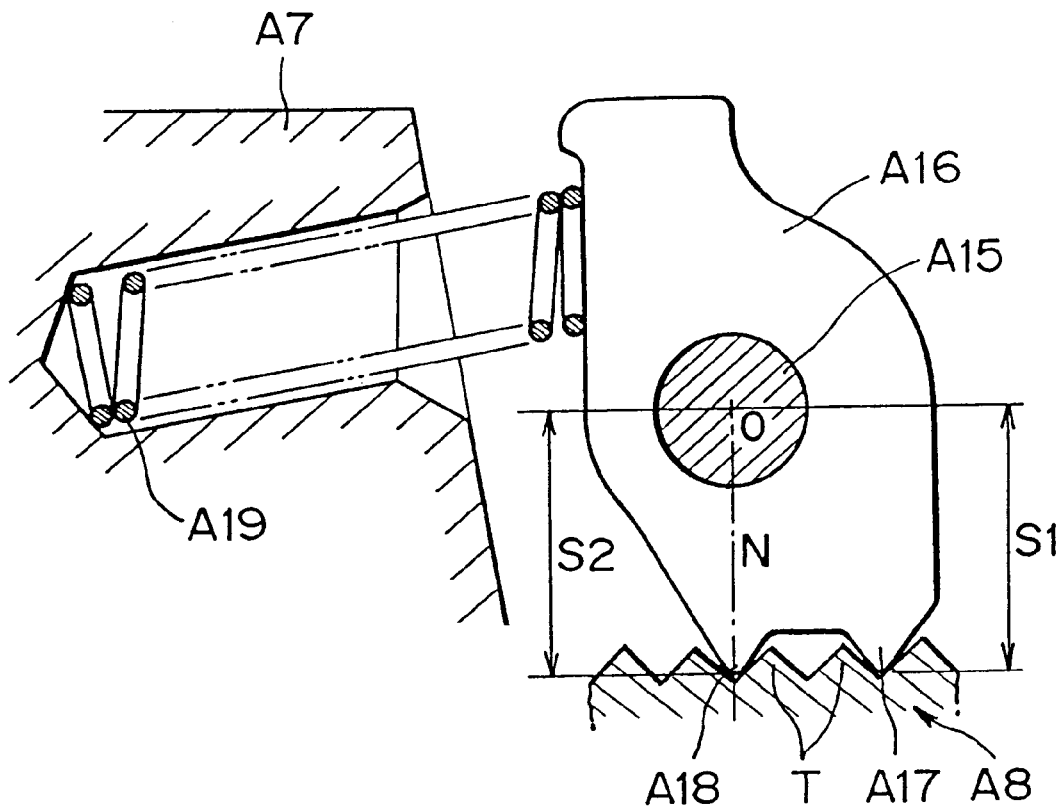
FIG. 3 is a cross-sectional view showing a main portion of the conventional ratchet tensioner shown in FIG. 2.

The plunger 5 is slidably received in a plunger receiving hole 12, identical to the hole A12 shown in FIG. 2 for axial displacement relative to the tensioner housing 2. The plunger 5 is normally urged by a plunger spring (not shown in FIG. 1 but identical to the one A14 shown in FIG. 2) in a direction to project the free end portion of the plunger 5 from the plunger receiving hole 12 of the tensioner housing 2. The ratchet 1 has a spring retaining surface 10 against which a ratchet spring 9 partly received in a spring retaining hole 8 formed in the tensioner housing 2 abuts at its projecting end. By the force of the ratchet spring 9, the ratchet 3 is normally urged to turn about the ratchet shaft 3 in the clockwise direction shown in FIG. 1.

The first ratchet prong 6 is disposed adjacent the free end of the plunger 5 in mesh with one of the ratchet teeth T at a position displaced or offset from an imaginary line N perpendicular to the direction of movement D of the plunger 5 and passing through an axis O of the ratchet shaft 3 toward a free end of the plunger 5 by a distance "a". The second prong 7 is aligned with the imaginary line N, so that the distance "a" represents the spacing between the prongs 6 and 7, which is an integral multiple of the spacing "p" between the teeth T. When the first ratchet prong 6 is disposed in a position where it is mutually engaged with the above-mentioned one ratchet tooth T, a top or tip-end of the second ratchet prong 7 is received between two adjacent ones of the ratchet teeth T and confronts a bottom laud "b" between the two adjacent ratchet teeth T at a position located on the perpendicular line N.

An extent of projection (projecting length) S2 of the second ratchet prong 7, which is measured from the axis O of the ratchet shaft 3 to the top of the prong 7 in a direction parallel to the perpendicular N, is made smaller than a corresponding extent of projection (projecting length) S1 of the first ratchet prong 6 at least by a given manufacturing tolerance of the prongs 6, 7, so that there is assuredly a slight gap or clearance between the top of the second ratchet prong 7 and the bottom land "b" of the ratchet teeth T, even if the two prongs are at opposite ends in the range of their manufacturing tolerances. The difference in the length of the prongs is less than the depth of the ratchet teeth T, so as to insure engagement of the prong 7 with the teeth T.

With the ratchet tensioner thus constructed, when the ratchet 1 turns clockwise about the ratchet shaft 3 to move the first ratchet prong 6 into the proximity of a position where the first ratchet prong 6 and one of the ratchet teeth T are mutually engaged with each other, the top of the second ratchet prong 7 is disposed at a position closest to the bottom land "b" of the ratchet teeth T. In this instance, the top of the second ratchet prong 7 and the bottom land "b" of the ratchet teeth T do not become stuck due to interference therebetween. Accordingly, when the chain tension decreases, the plunger 5 is displaced forwardly by the force of the plunger spring (see FIG. 2) while turning the ratchet 1 counterclockwise about the ratchet shaft 3 against the force of the ratchet spring 8.

It is desirable that a hydraulic shock absorbing mechanism of a known construction using a ball check valve, such as shown in FIG. 2, is assembled in the tensioner housing 2 so as to absorb an impact or shock force which may be applied to the plunger 5. The hydraulic shock absorbing mechanism may be omitted to simplify the overall construction of the ratchet tensioner.

As described above, when the first ratchet prong is in mesh with one of the ratchet teeth adjacent the free end of the plunger, the second ratchet prong is received between two adjacent ones of the ratchet teeth at a position located on the perpendicular line N through the axis of the ratchet shaft 3. The extent of projection (projecting length) of the second ratchet prong 7, which is measured from the axis of the ratchet shaft to a top or tip end of the second ratchet prong in a direction parallel to the perpendicular and is made smaller than a corresponding extent of projection (projecting length) by an amount equal to the given manufacturing tolerance of the first ratchet prong. Thus, if the projection of the first prong is at the small end of the range afforded by the manufacturing tolerance, the second prong will assuredly be no longer than the first prong. It is therefore possible to avoid interference between the second ratchet prong and any one of the ratchet teeth which would otherwise be caused due to variations of the projecting length of the second ratchet prong produced during the manufacture of the ratchet. The second ratchet prong and the ratchet teeth are thus prevented from becoming stuck and hence do not hinder or lock smooth movement of the plunger. This enables a reduction in the percent of defective ratchet tensioners produced without requiring precision manufacture of the ratchet. Because the respective projecting lengths of the first and second ratchet prongs are allowed to vary to some extent, the ratchet can be manufactured with high productivity and at a reduced cost.

Since the projecting length of the second ratchet prong is assuredly smaller than the projecting length of the first ratchet prong, the second ratchet prong is completely free from becoming stuck with the ratchet teeth even when the axis of the plunger is tilted up toward the ratchet by metal particles introduced along with a lubrication oil into a clearance between the plunger receiving hole and a portion of the outer peripheral surface of the plunger diametrically located opposite to the ratchet teeth.

While a particular embodiment of the invention has been herein illustrated and described, it is not intended to limit the invention to such disclosures, but changes and modifications may be made therein and thereto within the scope of the following claims.

I claim:

1. An improved ratchet tensioner having
    a tensioner housing with a bore having an open end,
    a plunger having an outer peripheral surface received in said bore for displacement in a line of travel axially of said bore, and having a free end and a free end portion adjacent said free end projecting through said open end, said plunger having a series of ratchet teeth extending in an axial direction on one side of said outer peripheral surface,
    a spring urging said free end away from said bore,
    a ratchet shaft mounted on said housing and having a pivot axis defining an imaginary line perpendicular to said line of travel, and
    a ratchet pivotally supported on said ratchet shaft, said ratchet having ratchet prongs engageable with said ratchet teeth so as to prevent said plunger free end from displacing backward toward said housing bore, wherein said ratchet prongs comprise a first ratchet prong adjacent said free end of the plunger and adapted to fit between a pair of adjoining ratchet teeth, and engage with one of said pair of ratchet teeth, and a second ratchet prong located remotely from said free end and adapted to fit between a second pair of ratchet teeth proximate to said imaginary perpendicular line when said first prong engages said one of said first pair of teeth,
    said first and second ratchet prongs having respective projecting lengths within a given manufacturing tolerance measured from a line parallel to the the line of travel passing through the pivot axis of said ratchet shaft to the tops of said first and second prongs in a direction parallel to said imaginary perpendicular line, said projecting length of said second ratchet prong being smaller than the projecting length of said first prong by a difference more than said given manufacturing tolerance.

2. A tensioner according to claim 1 wherein said ratchet teeth have a preselected depth, and said difference is less than said preselected depth.

3. A tensioner according to claim 1 wherein said ratchet teeth have a tooth spacing of a given pitch, and said first and second prongs are spaced apart parallel to the line of travel by a prong spacing which is an integral multiple of said tooth spacing.

* * * * *